United States Patent [19]
Remboski, Jr. et al.

[11] Patent Number: 5,508,927
[45] Date of Patent: Apr. 16, 1996

[54] APPARATUS AND METHOD FOR VARIABLE WINDOWED PEAK DETECTION IN A MISFIRE DETECTION SYSTEM

[75] Inventors: Donald J. Remboski, Jr., Dearborn; Steven L. Plee, Brighton; Marvin L. Lynch, Detroit; Michael A. McClish, Northville, all of Mich.

[73] Assignee: Motorola, Inc., Schaumburg, Ill.

[21] Appl. No.: 280,101

[22] Filed: Jul. 25, 1994

[51] Int. Cl.⁶ .............................. G06G 7/70; G01L 3/26
[52] U.S. Cl. ................. 364/431.08; 364/431.07; 364/431.03; 73/117.3; 73/112; 123/425
[58] Field of Search .................... 364/431.01–431.12, 364/437, 511, 724.1, 571.04, 573, 577, 723, 554, 517, 550; 73/116, 117.3, 112, 862, 35, 66, 462, 118.1; 123/198 D, 435, 672, 478, 494, 425, 625, 637, 436

[56] References Cited

U.S. PATENT DOCUMENTS

| | | | |
|---|---|---|---|
| 5,041,980 | 8/1991 | Maddock et al. | 73/116 |
| 5,095,745 | 3/1992 | James et al. | 73/116 |
| 5,109,695 | 5/1992 | James et al. | 73/117.3 |
| 5,125,381 | 6/1992 | Nutton et al. | 123/425 |
| 5,239,473 | 8/1993 | Ribbens et al. | 364/431.08 |
| 5,278,760 | 1/1994 | Ribbens et al. | 364/431.07 |
| 5,311,711 | 5/1994 | Young | 73/117.3 |
| 5,357,790 | 10/1994 | Hosoya | 73/117.3 |
| 5,387,253 | 2/1995 | Remboski, Jr. et al. | 73/117.3 |

Primary Examiner—Kevin J. Teska
Assistant Examiner—Jacques H. Louis-Jacques
Attorney, Agent, or Firm—Nicholas C. Hopman

[57] ABSTRACT

An apparatus, and a corresponding method, for determining misfire in a reciprocating engine operates on a selectable quantity of discrete sampled acceleration signals that are indicative of acceleration behavior of the reciprocating engine. A decimation device selects a quantity of the discrete sampled acceleration signals dependent on an engine family, and optionally engine operating conditions such as speed and load. An accelearation signal is selected from the sampled acceleration signals, preferably the sample having the most negative magnitude. A misfire determination device provides a misfire indication dependent on the selected acceleration signal.

28 Claims, 2 Drawing Sheets

APPARATUS AND METHOD FOR VARIABLE WINDOWED PEAK DETECTION IN A MISFIRE DETECTION SYSTEM

FIELD OF THE INVENTION

This invention is generally directed to the field of engine controls, and specifically to a signal processing apparatus and method for a reciprocating engine misfire detection system.

BACKGROUND OF THE INVENTION

Many contemporary engine controls have integral misfire detection systems. With ever-increasingly more stringent emissions standards the assurance of accurate and complete of misfire detection under all engine and vehicular operating conditions is becoming mandatory.

Commonly, system designers rely on measurement of crankshaft engine angular velocity, and sometimes crankshaft or other forms of, engine acceleration, both dependent largely on engine torque produced during a firing process to determine misfiring of a particular engine cylinder. Typically, misfires are predicted by various signature analysis, and/or spectral analysis, methods that analyze the velocity or acceleration information provided.

In a typical prior art misfire detection systems the system's main microcontroller is often charged with analyzing the misfire event. As misfire detection over all operating conditions becomes required a greater burden is shared by the main microcontroller in completing this task. This becomes particularly difficult at high engine speeds because the main microcontroller must forfeit much of its resources to service the misfire detection strategy. This requires a significant increase in the complexity of the main microcontroller.

What is needed is an improved signal processing approach for misfire detection, particularly one that is less resource intensive particularly at high engine speeds.

DETAILED DESCRIPTION OF A PREFERRED EMBODIMENT

An apparatus, and a corresponding method, for determining misfire in a reciprocating engine operates on a selectable quantity of discrete sampled acceleration signals that are indicative of acceleration behavior of the reciprocating engine. A decimation device selects a quantity of the discrete sampled acceleration signals dependent on an engine family, and optionally engine operating conditions such as speed and load. An acceleration signal is selected from the sampled acceleration signals, preferably the sample having the most negative magnitude. A misfire determination device provides a misfire indication dependent on the selected acceleration signal.

As mentioned in the background section, in a typical misfire detection system the system's main microcontroller is often charged with analyzing the misfire event. As the need for detecting misfire over all, and particularly high engine speed, operating conditions evolves a greater burden is shared by the main microcontroller in completing this task. To minimize the burden on the main microcontroller—thereby not requiring a greater complexity a dedicated high bandwidth front end mechanism will be applied.

Essentially, the high bandwidth front end includes dedicated filtering and decimation mechanisms to significantly reduce the resource load on the main microcontroller. Particularly, the decimation mechanism reduces the effective signal bandwidth so that the misfire determination strategy can operate at a significantly slower rate—thereby minimizing the resource demand on the main microcontroller.

Figure 1:
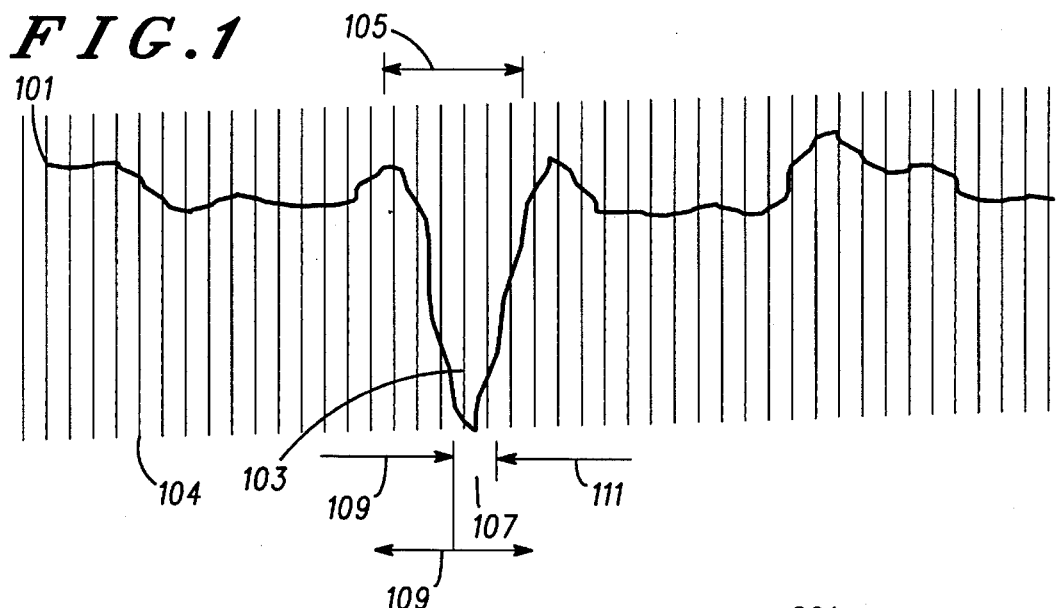
FIG. 1 is a chart illustrating a waveform representing a filtered acceleration signal representative of engine torque derived from a reciprocating engine with a repetitive misfire event.

FIG. 1 is a chart illustrating a waveform 101 representing a filtered acceleration signal representative of engine torque derived from a reciprocating engine. A forced misfire event is shown at reference number 103. Further details of FIG. 1 will be described after the introduction of FIG. 2.

Figure 2:
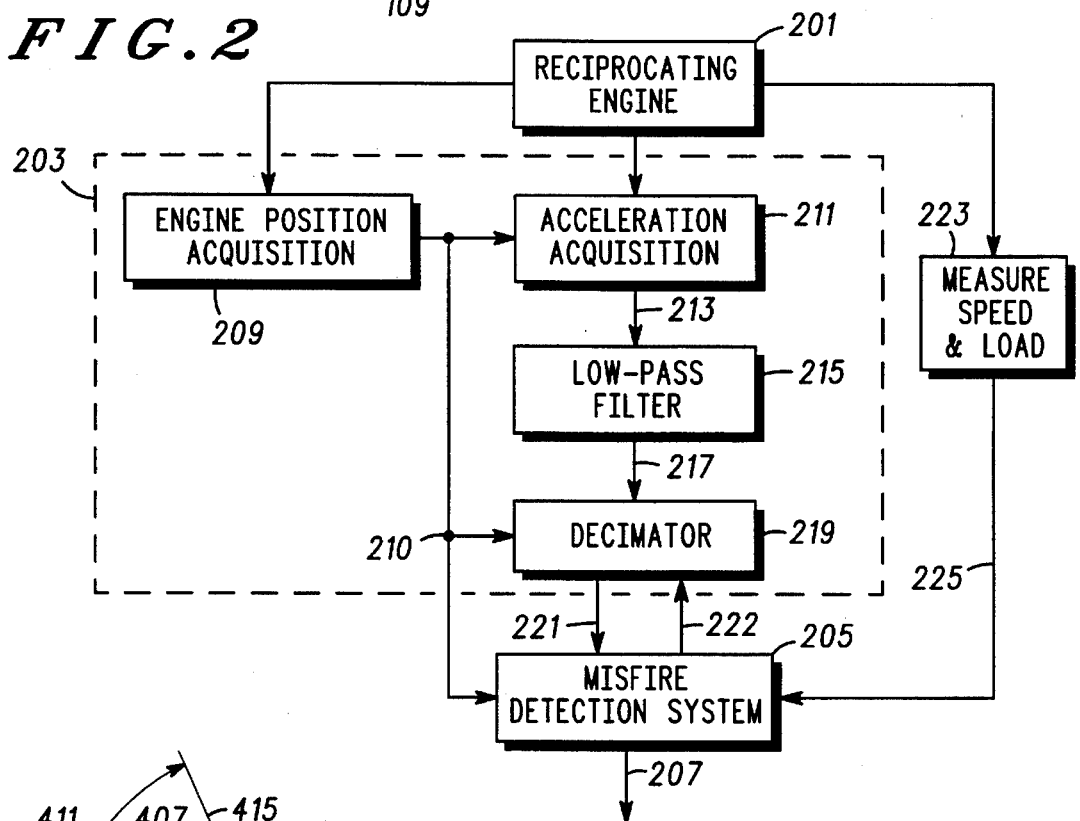
FIG. 2 is a system block diagram in accordance with a preferred embodiment.

FIG. 2 is a system block diagram according to a preferred embodiment. A reciprocating engine 201 is coupled to an apparatus 203. Here, the apparatus 203 is constructed using a mixed analog-digital application specific integrated circuit or ASIC. The ASIC device 203 has an architecture that emulates certain of the method steps described later. An engine position acquisition apparatus 209, includes circuitry to determine an absolute position of the reciprocating engine 201. This absolute engine position is used later to synchronize various functions within the ASIC device 203. There are many well-known techniques for determining an absolute position of an engine. Here, a variable reluctance sensor is coupled to a toothed wheel driven by the a crankshaft of the reciprocating engine 201. There are 18 teeth on the toothed wheel causing a pulse to be output from the variable reluctance sensor every 20° of engine rotation. Since in a four-stroke reciprocating engine 720° of crankshaft revolution constitutes a complete engine cycle.

Another variable reluctance sensor senses a singular tooth, corresponding to top-dead-center of cylinder #1 of the reciprocating engine 201, on another toothed wheel coupled to the reciprocating engine's 201 camshaft. Given outputs from the two variable reluctance sensors, the engine position acquisition system 209 outputs engine absolute position information 210. This type of apparatus is well known to those skilled in the art.

Another element 211 acquisitions acceleration information from the reciprocating engine 201. This element 211 is based around a speed sensor, such as the above-mentioned variable reluctance sensor coupled to a toothed wheel driven by the reciprocating engine 201. Those skilled in the art will recognize many approaches to acquisition the engine's acceleration information. The acceleration acquisition element 211 outputs an acceleration signal 213 to a lowpass filter 215. In the preferred embodiment the lowpass filter 215 is a switched-capacitor type lowpass filter. This lowpass filter 215 is necessary in an acceleration based misfire detection system to improve the fidelity of the acceleration signal 213 by eliminating high-frequency noise on the acceleration signal 213. The lowpass filter 215 provides a filtered acceleration signal 217 dependent on the acceleration signal 213. The filtered acceleration signal 217 is a discrete sampled acceleration signal. A waveform representing this filtered acceleration signal 217 was shown previously in FIG. 1.

Returning to FIG. 1, the acceleration waveform 101 is sampled by the acceleration acquisition element 211 at a rate of 18 samples/revolution of crankshaft rotation. Vertical reference lines in FIG. 1, represented by reference number 104 illustrate the 18 cycles/revolution sampling events. Later, in FIG. 2 a misfire detection mechanism will use the acquired (sampled) data to determine misfire based on a threshold technique. Because the misfire detection mechanism is microcontroller based there is a need to reduce the high data rate sample of 18 samples/revolution to one sample/engine cylinder firing to minimize the time, thus the computational burden, required by the microcontroller for detection of engine misfire. Reduction of the high data rate sample of 18 samples/revolution to one sample/engine cylinder firing is feasible because a misfire event, represented in FIG. 1 with reference number 103, can physically occur only within a small sampling window in engine angular rotation within the cylinder firing event. An example of this is relationship is shown in FIG. 1. Reference number 105 shows a sampling window encompassing 6 sample events, or acceleration measurements. These 6 sample events represent an angular position associated with a portion of a particular cylinder's combustion cycle. This sampling window of angular position represents the portion of the cylinder's combustion cycle that does not overlap other cylinders' firing events so that the behavior of the acquired acceleration signal is isolated to the cylinder of interest. Another sampling window 107 is bounded within and demarcates a subset of the 6 samples from the sampling window 105. This sampling window 107 represents a first reduction of the 18 samples/revolution to one sample/engine cylinder firing. The purpose of reducing the sampling window is to more reliably capture the misfire dependent acceleration signal 213 rather than a noise related signal. To accomplish this, the window 107 is both scaleable in width and offset as shown by reference number 111 in terms of engine angular position.

Returning to FIG. 2 a decimator 219 provides the reduction in data rate function in two parts. The first part is to effectuate the sampling window 107 width and offset in terms of engine angular position, and secondarily by selecting a most negative magnitude processed acceleration value 221 bounded within each cylinder's sampling window 107. The decimator 219 does this by considering the engine absolute position information 210 provided by the engine position acquisition system 209, the filtered acceleration signal 217 provided by the lowpass filter 215, and a width-offset command 222. The decimator 219 considers acceleration data within a sampling window where misfire is expected to happen. This windowing approach is useful in improving the fidelity of misfire detection, because noise present outside the predetermined sample period will not effect the decimation process. Also, the windowing of the decimation device is made selectable, or programmable, in terms of sampling window size and offset relative to a particular cylinder's firing portion of the combustion cycle. This is an important feature because different engine families, and different engine dynamics can cause the noise to shift proximate to the true misfire data.

A misfire detection system 205 based on the microcontroller, embedded in the misfire detection system, generates the width-offset command 222 dependent on a calibration derived for each engine family. Once the most negative processed acceleration value 221 bounded within each cylinder's sampling window 107 is presented to the misfire detection system 205, a threshold approach is used to provide a misfire indication signal 207. The width-offset command selects the width of the sampling window—or the number of samples operated on by the decimator 219 and the offset—or starting point of the sampling window in accordance with the expected misfire occurrence in the particular cylinder under analysis. This width-offset command also can be dependent on engine operating conditions. This can be advantageous when used with lean-burn technologies. An engine speed and load determination device 223 provides a measurement of engine speed and load 225. Optionally, other engine operating parameters can be measured and used to alter the width-offset command. Using either or both of the engine speed and/or load measurements enables the sampling window width (or number of samples operated on from the cylinder of interest) to be varied, and also the offset (or position of the expected misfire event) to be varied. Next, details of the method describing the actual operation of the decimator 219 will be revealed.

The method steps 300 are continuously executed. At a first step 303, the decimator 219 reads a sample number representative of the absolute engine angular position, window size, and window offset provided by the microcontroller indigenous to the misfire detection system. Also, a peak acceleration variable described later, is cleared. In practice, each cylinder event is assigned one sampling window consisting of x samples. The total number of windows and the maximum width of each sampling window are determined by the number of cylinders and the sampling rate. An example for various 4-stroke engine configurations is shown next for a sampling rate of 18 samples/revolution.

TABLE 1

| # of cylinders | # of windows | maximum window width (# of data samples) |
| --- | --- | --- |
| 4 cylinder | 2 | 9, 9 |
| 6 cylinder | 3 | 6, 6, 6 |
| 8 cylinder | 4 | 4, 5, 4, 5 |

Note that the maximum window widths are alternating 4 and 5 samples wide for 8 cylinder engines because 18 samples/revolution is not evenly divided by 4.

In step 305 the sampling window 107 width and offset are adjusted dependent on engine operating condition based on a calibration. Preferably, the engine operating condition considered is engine speed. As noted above, the sampling window width and offset are variable so that they can be adjusted to more reliably capture the minimum processed acceleration signal due to misfire. Furthermore, in lean-burn combustion engines the offset will change with engine operating conditions due to variations in burn phasing. Also, the sampling window width may need to be changed with engine operating conditions due to variations in noise. For instance, at high engine speeds noise may enter into the sampling window 107 causing the need to narrow the sampling window.

Next, in the next step 307, the next acceleration sample is acquired by the acceleration acquisition device 211 and provided via the lowpass filter 215 as the filtered acceleration signal 217 to the decimator 219.

Then, in step 309 the current acceleration is compared to the previous saved "peak acceleration" (most negative acceleration). Note that in the first iteration of the method steps 300 the "peak acceleration" was cleared and is thereby zero. The purpose of this step is to find the most negative acceleration value within the current window. If the magnitude of the current sample's acceleration is lower than the peak acceleration variable, then step 311 is executed. If the current sample's acceleration is higher than the peak acceleration variable, then step 313 is executed.

In step 311 the peak acceleration variable is held (stored).

In step 313 the decimator 219 determines whether or not all of the samples within the sampling window have been considered. If they have, then step 317 is executed. If all of the samples within the sampling window have not been considered then step 315 increments the sample number and the process continues at step 305 until all of the accelerations have been considered for the sampling window of interest.

In step 317, since all of the acceleration data have been considered from the last sampling window, the next sampling window is selected and the sample number is cleared.

Finally, in step 319, the peak acceleration variable is posted to the microcontroller indigenous to the misfire detection system 205. Also, the peak acceleration variable is cleared in preparation for the evaluation of acceleration for the next cylinder.

Figure 4:
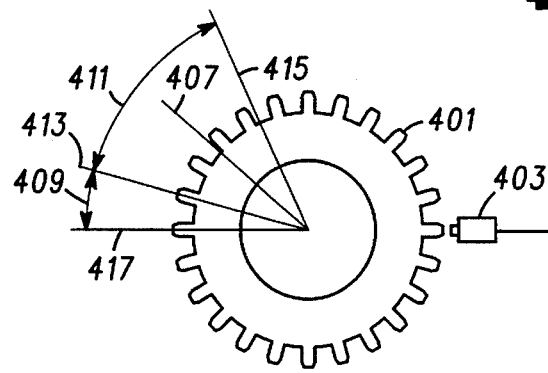
FIG. 4 is a schematic diagram illustrating physical correspondence of the windowing concept to a toothed wheel driven by the reciprocating engine in the preferred embodiment.
Figure 3:
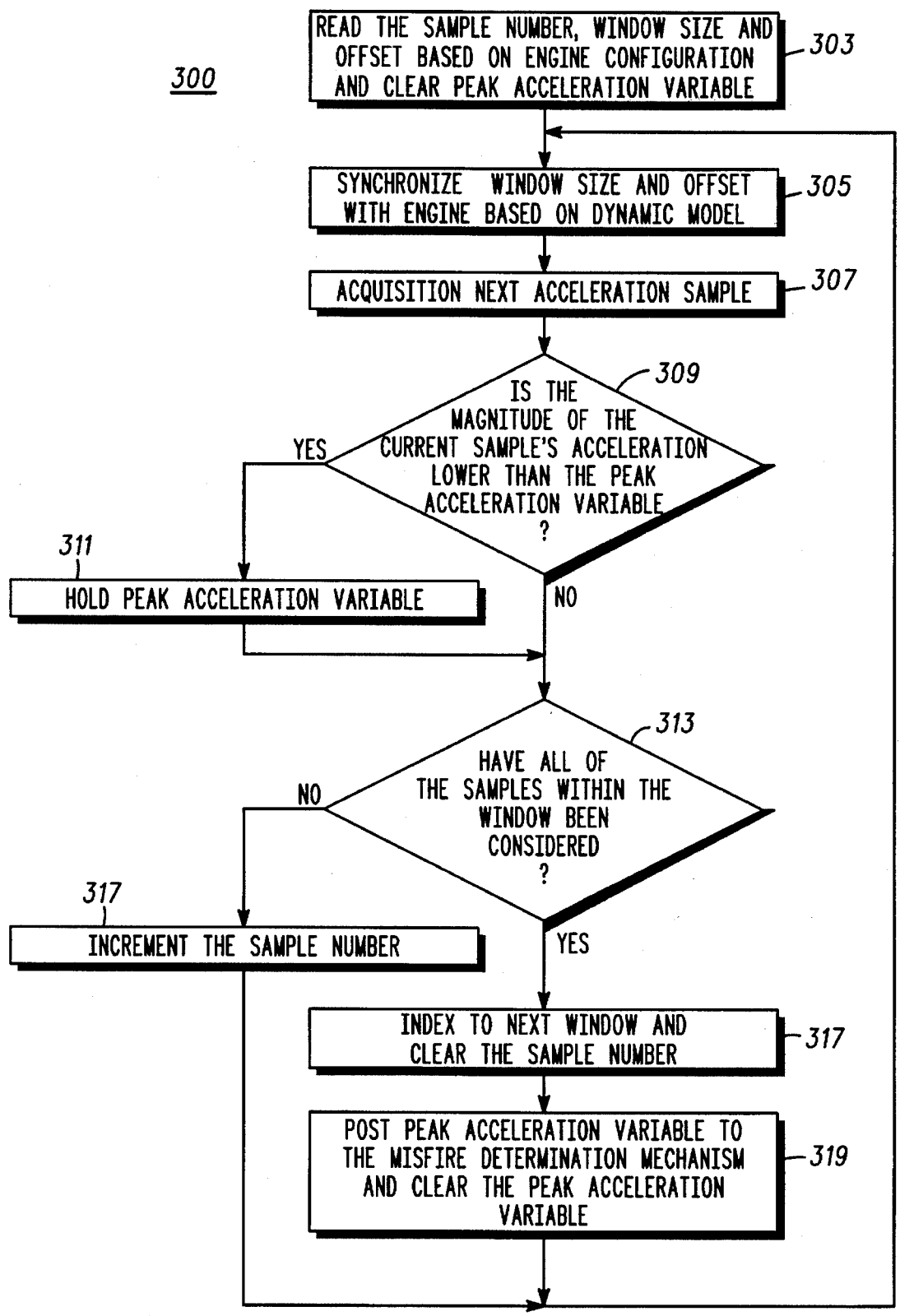
FIG. 3 is a flow chart showing various method steps, executable on the system shown in FIG. 2.

FIG. 4 is a schematic diagram illustrating physical correspondence of the windowing concept to a toothed wheel driven by the reciprocating engine in the preferred embodiment. FIG. 4 includes a toothed wheel 401 which is driven by the reciprocating engine 201. A variable reluctance sensor 403 provides an acceleration signal 405 indicative of the acceleration behavior of the reciprocating engine 201. Note here that the signal shown is a processed signal and not that actually produced by the variable reluctance sensor 403. The above-mentioned sampling window is illustrated here by reference number 411 which spans between two angular positions of a rotary member, here a toothed wheel 401 of the reciprocating engine 201. In this case an equal amount of the selectable quantity of the continuous stream of discrete sampled acceleration signals will be bounded within the sampling window 411, is acquired at angular positions 413, 415 surrounding the determined position of a cylinder indicated by a line 407 centered proximate the potential angle of a misfire. Note that the width of the sampling window 411 can be altered dependent on engine operating conditions such as speed and load to compensate for noise introduced into the acceleration data. Furthermore, the offset of the sampling window 411 can be altered for the same purpose as shown by reference numbers 409 and 417.

In conclusion, an apparatus and method for variable windowed peak detection in a misfire detection system has been detailed. This approach is beneficial because it is less resource intensive particularly at high engine speeds, and has additional noise rejection capability when contrasted with prior an schemes.

What is claimed is:

1. An apparatus for determining misfire in a reciprocating engine, the apparatus comprising:

acceleration measurement means for providing a continuous stream of discrete sampled acceleration signals indicative of acceleration behavior of the reciprocating engine;

decimation means for operating within a sampling window configured to act on a selectable quantity of the continuous stream of discrete sampled acceleration signals, provided by the acceleration measurement means, between two angular positions of a rotary member of the reciprocating engine, and for selecting an acceleration signal from the selectable quantity of the continuous stream of discrete sampled acceleration signals bounded within the sampling window; and misfire determination means for providing a misfire indication dependent on the selected acceleration signal.

2. An apparatus in accordance with claim 1 wherein the selected acceleration signal has a magnitude most negative of the selectable quantity of the continuous stream of discrete sampled acceleration signals bounded within the sampling window.

3. An apparatus in accordance with claim 1 further comprising:

positioning means for determining an angular position of a cylinder of the reciprocating engine; and wherein the decimation means responsive to the positioning means, acquires the selectable quantity of the continuous stream of discrete sampled acceleration signals bounded within the sampling window, wherein the sampling window is configured to acquire the discrete sampled acceleration signals, corresponding to the acceleration behavior of the reciprocating engine, associated with the angular position of the cylinder determined by the positioning means.

4. An apparatus in accordance with claim 3 wherein an equal amount of the selectable quantity of the continuous stream of discrete sampled acceleration signals bounded within the sampling window, is acquired at angular positions surrounding the determined position of the cylinder.

5. An apparatus in accordance with claim 1 further comprising:

means for measuring an engine operating condition; and wherein a quantity of the selectable quantity of samples of the discrete sampled acceleration signals bounded within the sampling window is dependent on the determined engine operating condition.

6. An apparatus in accordance with claim 5 wherein the means for measuring an engine operating condition comprises means for measuring engine speed.

7. An apparatus in accordance with claim 5 wherein the means for measuring an engine operating condition comprises means for measuring engine load.

8. An apparatus in accordance with claim 1 further comprising:

means for measuring an engine operating condition; and wherein the two angular positions of the rotary member of the reciprocating engine, corresponding to the selectable quantity of the continuous stream of discrete sampled acceleration signals bounded within a sampling window, are selectable dependent on the determined engine operating condition.

9. An apparatus in accordance with claim 8 wherein the means for measuring an engine operating condition comprises means for measuring engine speed.

10. An apparatus in accordance with claim 8 wherein the means for measuring an engine operating condition comprises means for measuring engine load.

11. An apparatus for variable windowed peak detection in a misfire detection system for a reciprocating engine, the apparatus comprising:

acceleration measurement means for providing a continuous stream of discrete sampled acceleration signals indicative of acceleration behavior of the reciprocating engine;

positioning means for determining an angular position of the reciprocating engine;

decimation means for operating within a sampling window configured to act on a selectable quantity of the continuous stream of discrete sampled acceleration signals corresponding to the determined angular position of the reciprocating engine, and for selecting an acceleration signal from the selectable quantity of the continuous stream of discrete sampled acceleration signals bounded within the sampling window; and misfire determination means for providing a misfire indication dependent on the provided selected acceleration signal.

12. An apparatus in accordance with claim 11 further comprising:

means for measuring an engine operating condition; and wherein the angular position of the reciprocating engine is selectable dependent on the determined engine operating condition.

13. An apparatus in accordance with claim 12 wherein the means for measuring an engine operating condition comprises means for measuring engine speed.

14. An apparatus in accordance with claim 13 wherein the selected acceleration signal has a magnitude most negative of the selectable quantity of the continuous stream of discrete sampled acceleration signals bounded within the sampling window.

15. An apparatus in accordance with claim 12 wherein the means for measuring an engine operating condition comprises means for measuring engine load.

16. A reciprocating engine misfire detection system having variable windowed peak detect, the system comprising:

an acceleration sensory system coupled to the reciprocating engine for providing a continuous stream of discrete sampled acceleration signals indicative of acceleration behavior of the reciprocating engine;

a positioning device for determining an angular position of the reciprocating engine;

a decimation device for operating within a sampling window configured to act on a selectable quantity of the continuous stream of discrete sampled acceleration signals the selectable quantity corresponding to a subset of the continuous stream of discrete sampled acceleration signals associated with the determined angular position of the reciprocating engine, and for selecting an acceleration signal having a magnitude most negative from the selectable quantity of the continuous stream of discrete sampled acceleration signals bounded within the sampling window; and a misfire determination device for providing a misfire indication dependent on the provided selected acceleration signal.

17. An apparatus in accordance with claim 16 further comprising:

means for measuring engine speed; and wherein the angular position determined by the positioning device is dependent on the determined engine speed.

18. A method for determining misfire in a reciprocating engine, the method comprising the steps of:

providing a continuous stream of discrete sampled acceleration signals indicative of acceleration behavior of the reciprocating engine;

operating within a sampling window configured to act on a selectable quantity of the continuous stream of discrete sampled acceleration signals, provided by the step of providing, between two angular positions of a rotary member of the reciprocating engine, and for selecting an acceleration signal from the selectable quantity of the continuous stream of discrete sampled acceleration signals bounded within the sampling window; and providing a misfire indication dependent on the selected acceleration signal.

19. A method in accordance with claim 18 wherein the selected acceleration signal has a magnitude most negative of the selectable quantity of the continuous stream of discrete sampled acceleration signals bounded within the sampling window.

20. A method in accordance with claim 19 further comprising the step of:

determining an angular position of a cylinder of the reciprocating engine; and wherein the step of operating, responsive to the step of determining an angular position of a cylinder, acquires the selectable quantity of the continuous stream of discrete sampled acceleration signals bounded within the sampling window, wherein the sampling window is configured to acquire the discrete sampled acceleration signals, corresponding to the acceleration behavior of the reciprocating engine, associated with the angular position of the cylinder determined by the step of determining an angular position of a cylinder.

21. A method in accordance with claim 20 wherein an equal amount of the selectable quantity of the continuous stream of discrete sampled acceleration signals bounded within the sampling window, is acquired at angular positions surrounding the determined position of the cylinder.

22. A method in accordance with claim 18 further comprising the step of:

measuring an engine operating condition; and wherein a quantity of the selectable quantity of samples of the discrete sampled acceleration signals bounded within the sampling window is dependent on the determined engine operating condition.

23. A method in accordance with claim 22 wherein the step of measuring an engine operating condition comprises a step of measuring engine speed.

24. A method in accordance with claim 22 wherein the step of measuring an engine operating condition comprises step of measuring engine load.

25. A method for variable windowed peak detection in a misfire detection system for a reciprocating engine, the method comprising the steps of:

providing a continuous stream of discrete sampled acceleration signals indicative of acceleration behavior of the reciprocating engine;

determining an angular position of the reciprocating engine;

operating within a sampling window configured to act on a selectable quantity of the continuous stream of discrete sampled acceleration signals corresponding to the determined angular position of the reciprocating engine, and for selecting an acceleration signal from the selectable quantity of the continuous stream of discrete sampled acceleration signals bounded within the sampling window; and providing a misfire indication dependent on the provided selected acceleration signal.

26. A method in accordance with claim 25 further comprising the step of:

measuring an engine operating condition; and wherein the angular position of the reciprocating engine is selectable dependent on the determined engine operating condition.

27. A method in accordance with claim 26 wherein the step of measuring an engine operating condition comprises step of measuring engine speed.

28. A method in accordance with claim 27 wherein the selected acceleration signal has a magnitude most negative of the selectable quantity of the continuous stream of discrete sampled acceleration signals bounded within the sampling window.

* * * * *